US012598265B2

(12) United States Patent
He et al.

(10) Patent No.: US 12,598,265 B2
(45) Date of Patent: Apr. 7, 2026

(54) COOPERATIVE PHOTOGRAPHING METHOD AND APPARATUS, ELECTRONIC DEVICE, AND COMPUTER-READABLE STORAGE MEDIUM

(71) Applicant: Beijing Bytedance Network Technology Co., Ltd., Beijing (CN)

(72) Inventors: Panlong He, Beijing (CN); Lei Shi, Beijing (CN); Chenman Zhou, Beijing (CN); Fanhua Feng, Beijing (CN); Zhihao Zhang, Beijing (CN)

( * ) Notice: Subject to any disclaimer, the term of this patent is extended or adjusted under 35 U.S.C. 154(b) by 50 days.

(21) Appl. No.: 18/044,062

(22) PCT Filed: Sep. 3, 2021

(86) PCT No.: PCT/CN2021/116519
§ 371 (c)(1),
(2) Date: Mar. 3, 2023

(87) PCT Pub. No.: WO2022/048651
PCT Pub. Date: Mar. 10, 2022

(65) Prior Publication Data
US 2023/0336684 A1     Oct. 19, 2023

(30) Foreign Application Priority Data
Sep. 4, 2020     (CN) .......................... 202010924413.4

(51) Int. Cl.
*H04N 5/272*          (2006.01)
*G06T 7/70*           (2017.01)
(Continued)

(52) U.S. Cl.
CPC .............. *H04N 5/272* (2013.01); *G06T 7/70* (2017.01); *H04N 5/265* (2013.01); *H04N 23/62* (2023.01);
(Continued)

(58) Field of Classification Search
CPC ........ H04N 5/272; H04N 5/265; H04N 23/62; H04N 23/63; H04N 23/661; G06T 7/70;
(Continued)

(56) References Cited

U.S. PATENT DOCUMENTS

| | | | |
|---|---|---|---|
| 11,516,521 B2 * | 11/2022 | da Silva Pratas Gabriel .............. | |
| | | | H04N 21/236 |
| 2019/0116214 A1 * | 4/2019 | Lal ........................... | G06T 7/337 |
| 2020/0118343 A1 * | 4/2020 | Koblin .................. | G06T 19/006 |

FOREIGN PATENT DOCUMENTS

| | | |
|---|---|---|
| CN | 107404617 A | 11/2017 |
| CN | 110111238 A | 8/2019 |

(Continued)

OTHER PUBLICATIONS

Intelligent group photo taking method and device (Wang Qianyi , Gao Yu) (Year: 2019).*

(Continued)

*Primary Examiner* — Yogesh K Aggarwal
(74) *Attorney, Agent, or Firm* — Alleman Hall LLP

(57) ABSTRACT

A cooperative photographing method is provided, which includes: acquiring a first image captured by a first terminal and a second image captured by a second terminal, and composing a third image based on the first image and the second image. In the third image, a first object in the first image and a second object in the second image are used as foreground objects and superimposed on a specified background image. The first object is a foreground object of the first image, and the second object is a foreground object of the second image.

19 Claims, 6 Drawing Sheets

(51) Int. Cl.
    *H04N 5/265*       (2006.01)
    *H04N 23/62*       (2023.01)

(52) U.S. Cl.
    CPC ..................... *G06T 2200/24* (2013.01); *G06T 2207/20092* (2013.01); *G06T 2207/20212* (2013.01)

(58) Field of Classification Search
    CPC ....... G06T 2200/24; G06T 2207/20092; G06T 2207/20212; G06T 11/60
    See application file for complete search history.

(56)                References Cited

FOREIGN PATENT DOCUMENTS

| | | | |
|---|---|---|---|
| CN | 110602396 | A | 12/2019 |
| CN | 110992256 | A | 4/2020 |
| CN | 111050072 | A | 4/2020 |
| CN | 111210397 | A | 5/2020 |
| CN | 112004034 | A | 11/2020 |
| JP | H10164435 | A | 6/1998 |
| JP | 2015012535 | A | 1/2015 |

OTHER PUBLICATIONS

Remote cooperative shooting method and device (Peng Dongwei) (Year: 2020).*

China National Intellectual Property Administration, International Search Report Issued in Application No. PCT/CN/2021/116519, Nov. 24, 2021, WIPO, 7 pages.

China National Intellectual Property Administration, Office Action and Search Report Issued in Application No. 202010924413.4, Jul. 1, 2021, 10 pages.

China National Intellectual Property Administration, Office Action and Search Report Issued in Application No. 202010924413.4, Sep. 28, 2021, 8 pages.

Replaced Written Opinion for International Application No. PCT/CN2021/116519, mailed Nov. 24, 2021, 8 pages.

Written Opinion for International Application No. PCT/CN2021/116519, mailed Mar. 16, 2022, 9 pages.

* cited by examiner

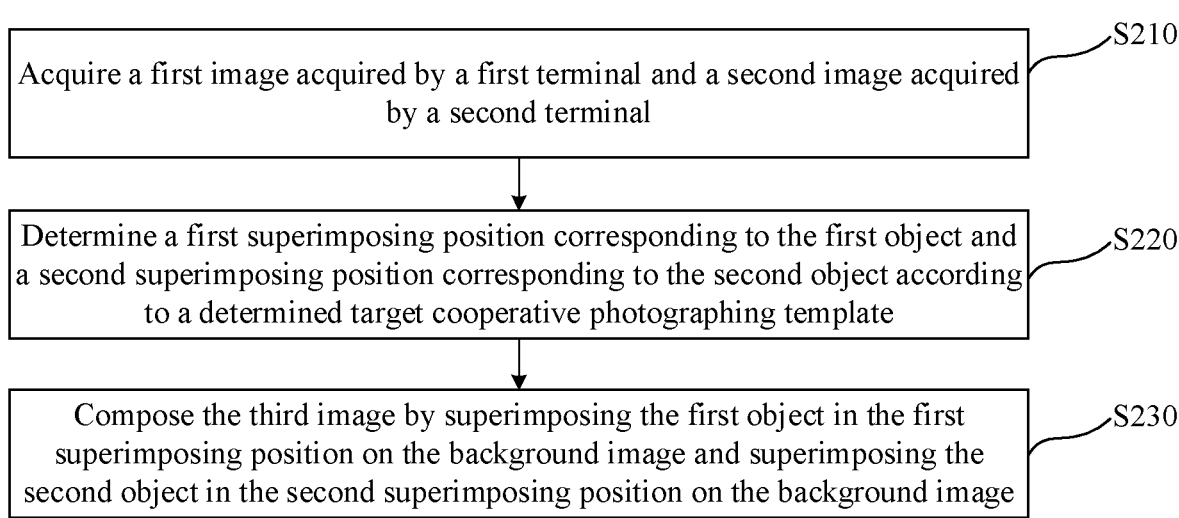

Acquire a first image acquired by a first terminal and a second image acquired by a second terminal ⎯S210

Determine a first superimposing position corresponding to the first object and a second superimposing position corresponding to the second object according to a determined target cooperative photographing template ⎯S220

Compose the third image by superimposing the first object in the first superimposing position on the background image and superimposing the second object in the second superimposing position on the background image ⎯S230

FIG. 3

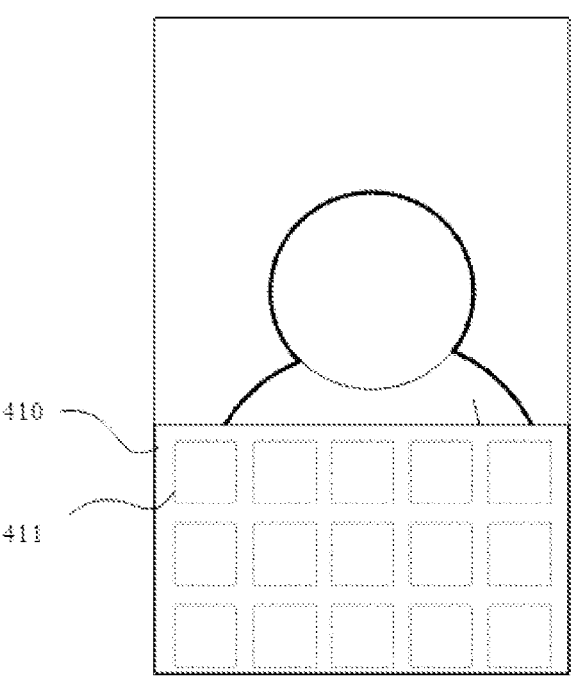

COOPERATIVE PHOTOGRAPHING METHOD AND APPARATUS, ELECTRONIC DEVICE, AND COMPUTER-READABLE STORAGE MEDIUM

CROSS-REFERENCE TO RELATED APPLICATION

This application is the national phase of International Patent Application No. PCT/CN2021/116519, titled "COOPERATIVE PHOTOGRAPHING METHOD AND APPARATUS, ELECTRONIC DEVICE, AND COMPUTER-READABLE STORAGE MEDIUM", filed on Sep. 3, 2021, which claims priority to Chinese Patent Application No. 202010924413.4, titled "COOPERATIVE PHOTOGRAPHING METHOD AND APPARATUS, ELECTRONIC DEVICE, AND COMPUTER-READABLE STORAGE MEDIUM", filed on Sep. 4, 2020, both of which are incorporated herein by reference in their entireties.

FIELD

The present disclosure relates to the technical field of image processing, and in particular to a cooperative photographing method, a cooperative photographing apparatus, an electronic device and a computer-readable storage medium.

BACKGROUND

With the development of mobile Internet and the popularity of mobile terminals, more and more users spontaneously create and upload some contents to a social platform to share with others. Usually, a content producer uses a photographing device of a mobile terminal to capture and upload interesting images and videos to the social platform to share with other users. However, the current cooperative photographing method lacks diversity and interactivity.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

In a first aspect, the embodiments of the present disclosure provide a cooperative photographing method, which includes: acquiring a first image captured by a first terminal and a second image captured by a second terminal; and composing a third image based on the first image and the second image, where in the third image, a first object in the first image and a second object in the second image are used as foreground objects and superimposed on a specified background image, the first object is a foreground object of the first image, and the second object is a foreground object of the second image.

In a second aspect, the embodiments of the present disclosure provide a cooperative photographing apparatus, which includes: an image acquisition module, configured to acquire a first image captured by a first terminal and a second image captured by a second terminal; and an image composition module, configured to compose a third image based on the first image and the second image, where in the third image, a first object in the first image and a second object in the second image are used as foreground objects and superimposed on a specified background image, the first object is a foreground object of the first image, and the second object is a foreground object of the second image.

In a third aspect, the embodiments of the present disclosure provide an electronic device, which includes one or more computer programs, where the one or more computer programs are stored in a memory and configured to be executed by one or more processors, and the one or more computer programs are configured to perform the method described in the first aspect above.

In a fourth aspect, the embodiments of the present disclosure provide a computer-readable storage medium storing a computer program. When the computer program is invoked and executed by a processor, the method described in the first aspect above is implemented.

With the cooperative photographing method, apparatus, electronic device and computer-readable storage medium provided by the embodiments of the present disclosure, the first image captured by the first terminal and the second image captured by the second terminal are acquired, and then the third image is composed based on the first image and the second image, so that in the third image, the first object in the first image and the second object in the second image are used as foreground objects and superimposed on the specified background image, the first object is the foreground object of the first image, and the second object is the foreground object of the second image. Thus, with the embodiments of the present disclosure, images captured by the first terminal and the second terminal are acquired respectively, and through composition, the first object in the first image and the second object in the second image are used as foreground objects and superimposed on the specified background image to obtain the third image, so that cooperative photographing can be realized based on multiple terminals. Even if users are in different geographical locations, they can still photograph a group photo by their terminals, thereby breaking the space limitation, enriching the social interaction of photographing, and improving the user experience. In addition, the embodiments of the present disclosure also reduce the cost of video production, and can combine images from multiple terminals in real time while photographing, without requiring post production, thus improving the creation efficiency.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

FIG. 3 is a flowchart of a cooperative photographing method according to another embodiment of the present disclosure.

FIG. 4 is a schematic diagram of a display interface according to an exemplary embodiment of the present disclosure.

DETAILED DESCRIPTION

Figure 1:
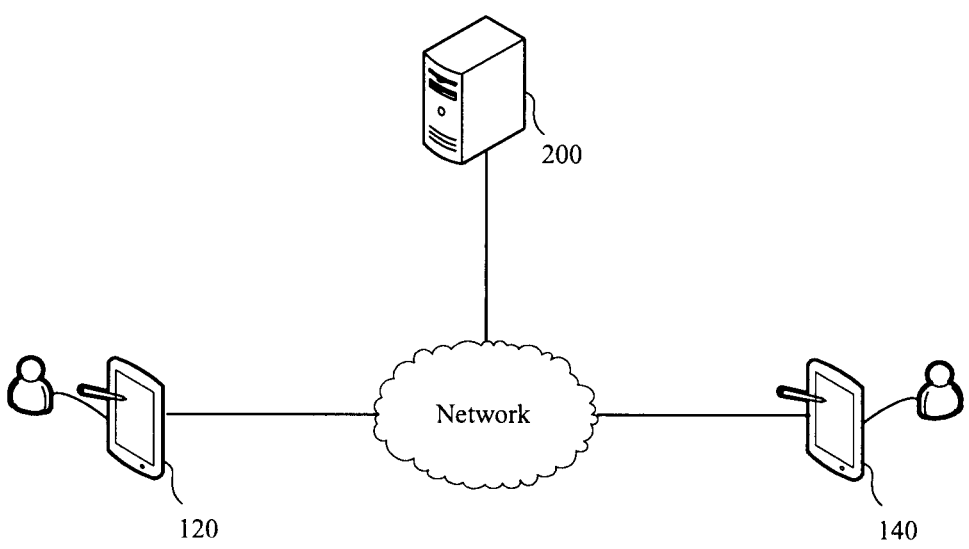
FIG. 1 is a schematic diagram of an implementation environment for applying embodiments of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish devices, modules or units, which are not used to limit that the devices, modules or units are different devices, modules or units and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

The technical solution of the present disclosure and how the technical solution of the present disclosure solves the above technical problems are described in detail below with specific embodiments. The following specific embodiments can be combined with each other, and the same or similar concepts or processes may not be repeated in some embodiments. The embodiments of the present disclosure will be described below with reference to the accompanying drawings.

FIG. 1 shows a schematic diagram of an implementation environment for applying embodiments of the present disclosure. The implementation environment includes a first terminal 120 and a second terminal 140.

The first terminal 120 and the second terminal 140 may be mobile phones, tablet computers, MP3 (Moving Picture Experts Group Audio Layer III) players, MP4 (Moving Picture Experts Group Audio Layer IV) players, wearable devices, on-board devices, augmented reality (AR)/virtual reality (VR) devices, laptops, ultra mobile personal computers (UMPC), netbooks, personal digital assistants (PDA) or special cameras (such as a SLR camera, a card camera), which are not limited in the embodiments of the present disclosure.

In addition, the first terminal 120 and the second terminal 140 may be two terminals of the same type or two terminals of different types, which is not limited in the embodiments of the present disclosure.

The first terminal 120 runs a first client and the second terminal 140 runs a second client. The first client and the second client may be client applications corresponding to a cooperative photographing platform, or other client applications having photographing functions. For example, the first client and the second client may be applications corresponding to short video platforms, social platforms or other platform that support image and cooperative photographing functions.

In some embodiments, the first terminal 120 and the second terminal 140 may be directly connected through a wired network or wireless network without using a server. In this case, the first terminal 120 and the second terminal 120 may send captured images to each other, locally generates and display a composite image.

In other embodiments, the first terminal 120 and the second terminal 140 may be in communication connection through a server. In this case, the implementation environment for applying the embodiments of the present disclosure further includes a server 200, which can be a traditional server, a cloud server, and may be a single server, a server cluster consisting of several servers, or a cloud computing service center. The first terminal 120 may be connected with the second terminal 140 through the server 200. The server 200 may be connected with the first terminal 120 and the second terminal 140 through a wired network or a wireless network to realize data interaction.

The embodiments of the present disclosure can be applied to the above terminals or server. If the execution subject is a server, the server 200 may compose an image and send the image to the first terminal 120 and the second terminal 140 for display. If the executing body is a terminal, such as the first terminal 120 and/or the second terminal 140, the terminal may compose an image based on an image captured by the terminal and an image captured by the other terminal. In an embodiment, the image can be composed by only one of the terminals and sent to the other terminal. For example, the first terminal 120 composes the image and sends the composed image to the second terminal 14. In another embodiment, each terminal may perform composition locally.

In some embodiments, the first terminal 120 and/or the second terminal 140 displays the composed image.

The following describes in detail the cooperative photographing method, the cooperative photographing apparatus, the electronic device and the computer-readable storage medium provided by the embodiments of the present disclosure.

Figure 2:
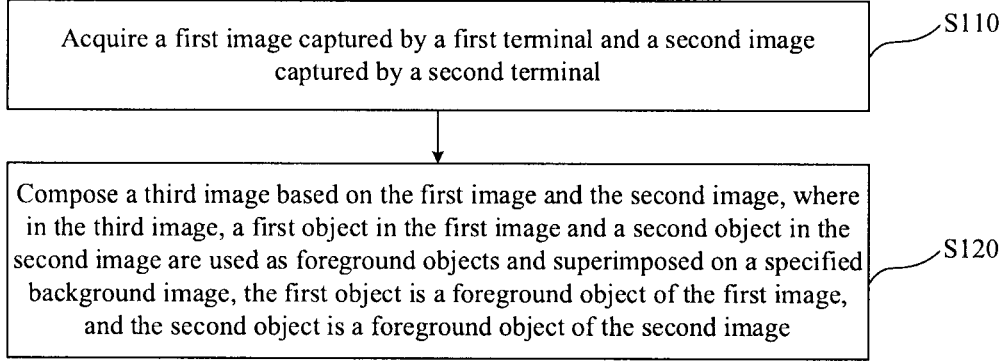
FIG. 2 is a flowchart of a cooperative photographing method according to an embodiment of the present disclosure.

FIG. 2 is a flowchart of a cooperative photographing method according to an embodiment of the present disclosure, which may be applied to the above terminal or server. Taking the execution subject being the first terminal as an example, the process shown in FIG. 2 is described in detail. The cooperative photographing method may include the following steps S110 and S120.

S110: Acquire a first image captured by a first terminal and a second image captured by a second terminal.

The first image may be an original image captured by the first terminal through an image acquisition device, or an image obtained by processing the original image. The image acquisition device can be a camera integrated in the first terminal, such as a front camera or a rear camera. Alternatively, the image acquisition device may be an external device connected to the first terminal in a wireless or wired manner, such as an external camera, which is not limited here. The second image is similar to the first image, and one may refer to the description of the first image, which will not be repeated here.

In some embodiments, before step S110, the first terminal may generate a cooperative photographing request in responses to a received cooperative photographing trigger instruction inputted by a user, and send the cooperative photographing request to the second terminal, so that the second terminal sends the second image to the first terminal in response to the cooperative photographing request. The cooperative photographing request is used to initiate a cooperative photographing invitation, inviting the other user to shoot an image or a video in cooperation with the user of the first terminal. If the other user agrees with the cooperative photographing invitation corresponding to the cooperative photographing request, the other user confirms the cooperative photographing request through the second terminal and sends a captured image to the first terminal in response to the cooperative photographing request.

For ease of understanding, the first terminal mentioned in the present disclosure represents the initiator of the cooperative photographing request, the second terminal represents the receiver of the cooperative photographing request, the user of the first terminal is referred to as the first user, and the user of the second terminal is referred to as the second user.

If the first terminal detects the cooperative photographing trigger instruction input by the first user, it generates a cooperative photographing request according to the cooperative photographing trigger instruction, and sends the cooperative photographing request to at least one second terminal. The second terminal may confirm the cooperative photographing request, and send the second image captured by the second terminal to the first terminal, so that the first terminal obtain the first image captured by the first terminal and the second image captured by the second terminal.

In process that the first terminal sends the cooperative photographing request to at least one second terminal, the first terminal may first send the cooperative photographing request to the server, and then the server forwards the cooperative photographing request to the second terminal, or the first terminal directly send the cooperative photographing request to the second terminal, which is not limited in embodiments of the present disclosure.

The second terminal can be one or more terminals, that is, the first terminal may send the cooperative photographing request to one or more second terminals, and can perform cooperative photographing with the one or more second terminals at the same time. In addition, the second user may or may not be a contact person of the first user. The second user may be a user who has a friend relationship with the first user in a same application or platform, or may be a unilaterally following user of the first user, or a user unilaterally followed by the first user, or may be any user who does not have a following or friend relationship with the first user, which is not limited in the embodiments of the present disclosure.

In some embodiments, a triggering control element for the cooperative photographing request may be displayed on a screen of the first terminal. If a trigger on the trigger control element, i.e., the cooperative photographing trigger instruction, is detected, the cooperative photographing request is generated. The first terminal may display a sending page for the cooperative photographing request, in which multiple pieces of receiver information to be selected are displayed. The receiver information includes user information and/or platform information. The user information includes at least one of a user avatar and a user name, and the platform information includes at least one of a platform icon and a platform name, which is not limited herein.

In some exemplary embodiments, if the first terminal detects a selection operation on user information, the first terminal may sends the cooperative photographing request to a user terminal corresponding to the selected user information. That is, the first terminal may invite the selected terminal to perform the cooperative photographing, so as to invite the user corresponding to the selected terminal to perform the cooperative photographing. If the first terminal detects a selection operation on platform information, the first terminal may send the cooperative photographing request to a server of a platform corresponding to the platform information, so that the server of the platform sends the cooperative photographing request sent by the first terminal to a number of unspecified second terminals, thereby realizing arbitrary cooperative photographing.

S120: Compose a third image based on the first image and the second image, where in the third image, a first object in the first image and a second object in the second image are used as foreground objects and superimposed on a specified background image, the first object is a foreground object of the first image, and the second object is a foreground object of the second image.

The specified background image may be a default image, or any image selected by the user, or a background image of the first image or a background image of the second image, which is not limited in the embodiments. Therefore, more photographing options are provided, so that users can easily replace the background, improving the creation efficiency and interestingness.

In some embodiments, the background image may be specified by the second terminal. As an embodiment, the second terminal may determine the specified background image according to an input of the second user, and send a corresponding background designation instruction to the first terminal. The first terminal may determine the image indicated by the background designation instruction as the specified background image.

The background designation instruction may carry an image identifier according to the input of the second user, and the image corresponding to the image identifier is used as the specified background image. Alternatively, the background designation instruction may carry a terminal identifier, so the background image of the image captured by the terminal corresponding to the terminal identifier is used as the specified background image. For example, if the terminal identifier is "device1", the background image of the first image captured by the first terminal corresponding to the terminal identifier "device1" is used as the specified background image.

In some other embodiments, the background image may be designated by the first terminal. As an embodiment, the first terminal may determine a background image for the current cooperative photographing according to the cooperative photographing trigger instruction. For example, the first terminal may display one or more cooperative photographing control elements for triggering the cooperative photographing trigger instruction. In this case, different control elements correspond to different background images. For example, control element 1 may take a default image as the specified background image, control element 2 may take a background image of the terminal triggering the cooperative photographing request as the specified background image by default, and control element 3 may specify the background image according to a user selection. Then, according to the cooperative photographing control element triggered by the user, the first terminal can obtain the corresponding cooperative photographing trigger instruction, and determine the background image for this cooperative photographing according to the cooperative photographing trigger instruction.

In some embodiments, the specified background image may be a fourth image selected by a user, where the user may be the first user or the second user. That is, the background image may be selected by any user. In addition, the terminal may preset multiple images, such as various images taken at a rooftop, a downtown, an alley or other places, so that the user can select one or more images as the fourth image according to as needed, and use the fourth image as the specified background image for the composition. Alternatively, multiple images may be acquired through the network for users to choose, which is not limited herein.

In some embodiments, the first terminal may perform image recognition processing on the first image to obtain the foreground object of the first image, i.e., the first object, and perform image recognition processing on the second image to obtain the foreground object of the second image, i.e., the second object. The first object and the second object are superimposed on the specified background image as foreground objects, so that the third image contains both the images captured by the first terminal and the second terminal. In this way, multiple terminals can perform cooperative photographing without limitations of space. Since the background images of the cooperative photographing can be selected by users, the first terminal and the second terminal can perform cooperative photographing based on various background images, which provides more choices for creation, thus meeting the diversity of user needs and realizing convenient background replacement.

In addition, in some embodiments, the first terminal and/or the second terminal may capture an image based on a green screen background, and then perform image recognition processing on the image captured in the green screen background, to extract a foreground object, and superimpose the foreground object on the specified background image to compose the third image, so as to achieve convenient background replacement. In this way, a video can be created with less constraints of reality, so that the user can fully use their creativeness and have more possibilities and freedom in creation, thereby improving the quality of user creations.

In an example scene, some young talented creators have many creative ideas (such as the lightness skill floating on water), but they are unable to create the video due to their limited technical ability. They expect a technology that can break through the restrictions of space and physical laws to achieve various ideas. In this case, they may communicate and perform cooperative photographing in real time based on the green screen background by using the improved cooperative photographing method in this example. Through green screen image cutting and background replacement in real time, the creative cooperative photographing that breaks through the constraints of reality can present at their terminals, which provides more possibilities and freedom in creation.

In other embodiments, the specified background image may also be the background image of the first image or the background image of the second image. In this way, the first object and the second object may be superimposed on the background image of the image captured by one terminal. For example, user A and user B may perform cooperative photographing based on the image captured by the terminal of user B.

In some embodiments, when the specified background image is the background image of the first image or the background image of the second image, the image recognition processing may be performed only on the target image that has not the specified background image to obtain the foreground object of the target image, which is then superimposed on the specified background image. For example, if the specified background image is the background image of the first image, the image recognition processing is performed only on the second image to obtain the second object of the second image, which is then used as a foreground object and superimposed on the first image, so as to compose the third image. For another example, if the specified background image is the background image of the second image, the image recognition processing is performed only on the first image to obtain the first object of the first image, which is then used as a foreground object and superimposed on the first image, so as to compose the third image.

In some other embodiments, when the specified background image is the background image of the first image or the background image of the second image, image recognition processing can still be performed on both the first image and the second image to extract their respective foreground objects to obtain the first object and the second object, which are then used as foreground objects and superimposed on the background image of the first image or the second image.

In some embodiments, while the first terminal and the second terminal capture the first and second images in real time, the first terminal continuously acquires the images captured in real time by the first and second terminals and compose the third images based on the first and second images, so that the images captured in real time by the first and second terminals can be used for the composition in real time. In some embodiments, after the composed third image is obtained, the third image is displayed, and further the real-time composed third image is displayed, so that what users see is what they get during the cooperative photographing process. Thus, when producing a video by the embodiments of the disclosure, the user can watch while photographing, and can obtain the cooperative photographing video without post composition, greatly improving the video production efficiency.

In an example, the first terminal may start a photographing platform application, enable a camera, select at least one second terminal and send a cooperative photographing request to the at least one second terminal. The second terminal confirms to establish a connection with the first terminal after receiving the cooperative photographing request, and also enable a camera. The second terminal transmits the second image captured by the camera of the second terminal to the first terminal. The first terminal also transmits the first image captured by the camera of the first terminal to the second terminal. Then the images captured by the first terminal and the second terminal can be seen on the respective terminals, and finally a video is obtained and recorded. In this way, the real-time cooperative photographing by multiple terminals is achieved, which not only provides a new social interactive method of cooperative photographing, but also allows users to watch while photographing. The cooperative photographing video can be obtained in real time without post composition, thus improving the cooperative photographing efficiency.

With the cooperative photographing method provided in the embodiment, by acquiring the first image captured by the first terminal and the second image captured by the second terminal, and then composing the third image based on the first image and the second image, in the third image the first object in the first image and the second object in the second image are superimposed on the specified background image as foreground objects, where the first object is the foreground object of the first image, and the second object is the foreground object of the second image. In this way, the embodiment of the present disclosure obtains images captured by the first terminal and the second terminal respectively, and composes the third image by superimposing the first object in the first image and the second object in the second image on the specified background image as foreground objects, so that the cooperative photographing can be realized based on multiple terminals. Even if users are in different geographical locations, they can still achieve cooperative photographing in different places by using their own terminals, which breaks through the space limitation, enriches the social interaction method of photographing, and improves the user experience. In addition, the embodiments of the present disclosure also reduce the cost of video production, and can compose images from multiple terminals in real time while photographing without post composition, thereby improving the creation efficiency.

In some possible embodiments, the cooperative photographing method provided by the embodiments of the present disclosure may be executed on a server. In this case, when the first terminal and at least one second terminal confirm to perform the cooperative photographing, the server acquires the images captured in real time by the first terminal and the second terminal, and then performs composition on the first and second images to obtain a composite image, and send the composite image to the first terminal and the at least one second terminal so that the first terminal and the at least one second terminal display the composite image. At the same time, the server continuously receives newly acquired images sent by the first and second terminals, and performs composition on the newly acquired images to obtain a new composite image, and then sends the new composite image to the first terminal and the at least one second terminal, so that the first terminal and the at least one second terminal display the new composite image, which is repeated until the server receives a photograph ending instruction. In this way, the server performs composition in real time on the images captured by the first and second terminals, and sends the real-time composite images to the first and second terminals, so that the first and second terminals display the real-time composite images in real time, thereby realizing real-time cooperative photographing by multiple terminals. This method not only provides a new social interactive method of cooperative photographing, but also allows users to watch while photographing and get the cooperative photographing video without post composition, thereby improving the efficiency of cooperative photographing.

In some embodiments, the specified background image may be an image selected by the user. In this way, the cooperative photographing can be performed based on any background, meeting the user requirement for cooperative photographing and achieve a rich effect of cooperative photographing. FIG. 3 shows a flowchart of a cooperative photographing method according to another embodiment of the present disclosure. The cooperative photographing method may include steps S210 to S230.

S210: Acquire a first image acquired by a first terminal and a second image acquired by a second terminal.

In some embodiments, before step S210, the first terminal may generate a cooperative photographing request in response to an acquired cooperative photographing trigger instruction inputted by a user, and send the cooperative photographing request to the second terminal, so that the second terminal sends the second image to the first terminal in response to the cooperative photographing request.

When the first terminal is required to perform the cooperative photographing, the first terminal sends a cooperative photographing request to at least one second terminal. In some embodiments, the cooperative photographing request may be sent to the at least one second terminal through a server. For example, the first terminal may send the cooperative photographing request including a terminal ID of the second terminal of a selected second user to the server according to the selection of at least one second user by the first user, so that the server sends the cooperative photographing request to the second terminal corresponding to the terminal ID. In some other embodiments, the cooperative photographing request may be directly sent to the second terminal. For example, the first terminal may send the cooperative photographing request to the second terminal in the form of a link, a quick response (QR) code or in other forms. The second user may click the link, or scan the QR code or use other ways to enable the second terminal to obtain the cooperative photographing request.

In an example, when the first user requires to perform cooperative photographing with at least one second user, the first user selects at least one second user from a social software (application software corresponding to a social platform) installed on the first terminal, such as instant messaging software, and clicks an control element for cooperative photographing in a function menu so that the first terminal obtains a corresponding cooperative photographing trigger instruction. The first terminal generates a cooperative photographing request in response to the cooperative photographing trigger instruction, and sends the cooperative photographing request to the second terminal of the second user through the server. Alternatively, the first user clicks the control element for cooperative photographing in the function menu so that the first terminal obtains a corresponding cooperative photographing trigger instruction and generates a cooperative photographing request page, configures a cooperative photographing request and sends the cooperative photographing request to the second terminal of the at least one second user selected by the user. After receiving the cooperative photographing request, the second terminal pops up corresponding prompt information in a display interface, such as "The first user requests to perform cooperative photographing with you, please select "Reject" or "Join", so that the second user can confirm the cooperative photographing request by clicking the button indicating "Join".

In another example, the first terminal may be installed with application software corresponding to a photographing platform, which is referred to as a photographing application. The first user starts the photographing application to enable the cooperative photographing function. For example, a photographing interface of the photographing application displays a control element for triggering the cooperative photographing function, and a cooperative photographing request is generated in response to a cooperative photographing trigger instruction from the control element. In a first manner, the first user selects at least one second user via the photographing application, to send a cooperative photographing request to the second terminal used by the second user. In another manner, the first user forwards the cooperative photographing request to a second application after generating the cooperative photographing request. In this case, the first terminal may start the second application, and send the cooperative photographing request to other users through the second application, so as to invite the other users to perform cooperative photographing. The specific confirmation method is similar to the above and will not be repeated here.

It can be understood that the above are only two examples of performing cooperative photographing by multiple terminals, but the disclosure is not limited thereto.

S220: Determine a first superimposing position corresponding to the first object and a second superimposing position corresponding to the second object according to a determined target cooperative photographing template.

The target cooperative photographing template is used to determine the superimposing position of the foreground object superimposed on the background image. The first terminal determines the first superimposing position corresponding to the first object and the second superimposing position corresponding to the second object according to the determined target cooperative photographing template.

In some embodiments, the target cooperative photographing template is determined according to a template selection instruction inputted by the user. Specifically, before step S220, the template selection instruction is obtained, and the target cooperative photographing template is determined from a plurality of candidate cooperative photographing templates according to the template selection instruction. The template selection instruction may be inputted by the first user of the first terminal or sent by the second terminal.

In some embodiments, the template selection instruction may be triggered when the first terminal generates the cooperative photographing request. For example, the first user may select a target cooperative photographing template when inputting the cooperative photographing trigger instruction by the first terminal, then the generated cooperative photographing request carries a template ID of the target cooperative photographing template. The second terminal obtains the template ID in the cooperative photographing request to determine the target cooperative photographing template, and performs the composition on the first image and the second image by using the target cooperative photographing template.

In an embodiment, the first terminal displays a photographing interface which includes a template selection button. When a trigger operation on the template selection button is detected, a template selection page is displayed. The template selection page displays multiple types of templates, and further displays one or more templates under each type. For example, the template selection page displays one or more candidate templates for cooperative photographing. Then, according to the cooperative photographing template selected by the user, i.e., the target cooperative photographing template, a cooperative photographing trigger instruction is obtained and a cooperative photographing request is generated, where the cooperative photographing request carries the template ID of the target cooperative photographing template.

In another embodiment, when acquiring the cooperative photographing trigger instruction, the first terminal displays a cooperative photographing request generation page. The cooperative photographing request generation page may include the template selection page or provide an entry to the template selection page. The template selection page displays at least one candidate cooperative photographing template for the user to select. In generating the cooperative photographing request, the first user selects a target cooperative photographing template for the current cooperative photographing.

FIG. 4 is a schematic diagram of a display interface according to an exemplary embodiment of the present disclosure. In the display interface shown in FIG. 4, the first terminal displays a template selection page 410 in response to a triggering operation on a template selection button. The template selection page 410 displays a plurality of cooperative photographing templates 411. The first terminal detects a trigger operation on the template selection page 410, and determines the cooperative photographing template 411 corresponding to the trigger operation, so as to determine the cooperative photographing template as the target cooperative photographing template, and obtain the corresponding template selection instruction.

In other embodiments, the template selection instruction is triggered by any one of the first terminals and the at least one second terminals after any one of the second terminals confirms the cooperative photographing request sent by the first terminal. For example, in response to the confirmation operation of at least one terminal on the cooperative photographing request, at least one of the first terminal and the second terminal displays a template selection page, and obtains a template selection instruction from the template selection page, to determine the target cooperative photographing template for the current cooperative photographing.

In some embodiments, the first terminal obtains the target cooperative photographing template selected by the user before generating the cooperative photographing request, so that the generated cooperative photographing request carries the template ID of the selected target cooperative photographing template. Then the first terminal sends the cooperative photographing request to the second terminal, so that the second terminal sends the second image to the first terminal in response to the cooperative photographing request. The subsequent composition is performed based on the target cooperative photographing template corresponding to the template ID.

In some other embodiments, the first terminal may send the template selection instruction and the cooperative photographing request separately. For example, after sending the cooperative photographing request, the first terminal displays a template selection page, prompting the user to select a target cooperative photographing template from a plurality of candidate cooperative photographing templates through the template selection page.

S230: Compose the third image by superimposing the first object in the first superimposing position on the background image and superimposing the second object in the second superimposing position on the background image.

After determining the first and second superimposing positions according to the determined target cooperative photographing template, the first object is superimposed in the first superimposing position on the background image, and the second object is superimposed in the second superimposing position on the background image, to compose the third image.

Figure 5:
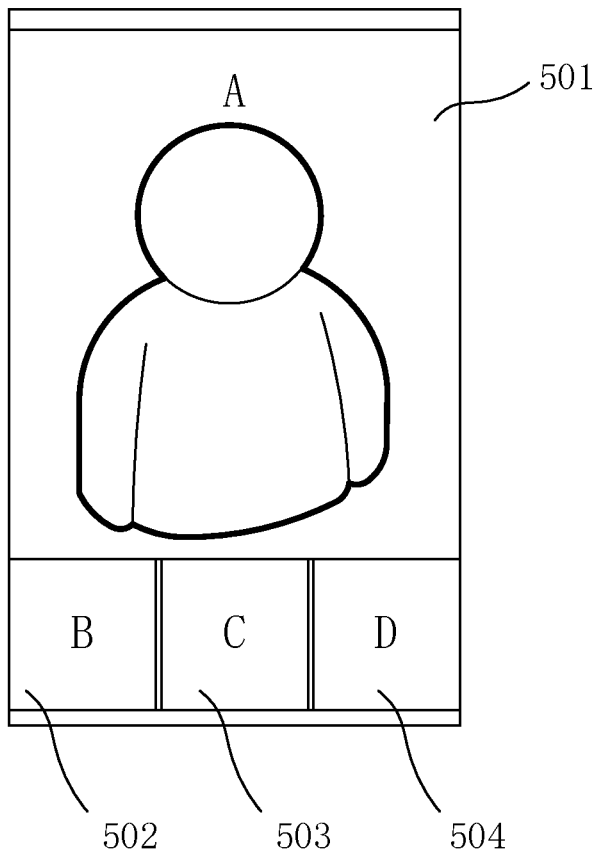
FIG. 5 is a schematic diagram of a display interface according to another exemplary embodiment of the present disclosure.

In an example, the specified background image is a fourth image selected by the user. FIG. 5 is a schematic diagram of a display interface according to another exemplary embodiment of the present disclosure. As shown in FIG. 5, user A initiates a cooperative photographing request, and users B, C, and D confirm the cooperative photographing request. A terminal acquires the images captured in real time by the terminals of user A, B, C and D, determines a target cooperative photographing template according to a template selection instruction, determines superimposing positions 501, 502, 503 and 504 respectively corresponding to user A, B, C and D based on the target cooperative photographing template, and superimposes the foreground objects corresponding to users A, B, C and D in positions 501, 502, 503 and 504 respectively, to finally obtain the third image. When the terminal displays the third image, the foreground objects of the images captured by the terminals of users A, B, C and D are all displayed based on the target capture template. If each terminal obtains the third image, users A, B, C and D can view the cooperative photographing result via their respective terminals at the same time.

It should be noted that the above is only an example, and the disclosure is not limited thereto. The embodiments of the disclosure may further support the composition of various cooperative photographing templates, which will not be described for concision.

In an exemplary application scenario, two members of a man team go on holiday in Hainan and Thailand respectively, and they want to make a video of a rabbit dance together to participate in the challenge of related topics. In this case, they can perform the cooperative photographing by the method provided by the embodiments of the present disclosure, so as to break through the space limitation and complete real-time cooperative photographing in different places. In this way, users participating in the cooperative photographing can omit the geographical distance and enjoy the fun of cooperative photographing.

It should be noted that, for the parts not described in detail in this embodiment, one may refer to the previous embodiment, which will not be repeated here.

Therefore, with the cooperative photographing method according to this embodiment, on the basis of the previous embodiment, the server determines the first superimposing position corresponding to the first object and the second superimposing position corresponding to the second object according to the determined target cooperative photographing template, superimpose the first object in the first superimposing position on the background image, superimpose the second object in the second superimposing position on the background image, to compose the third image. Therefore, according to different determined target cooperative photographing templates, the overlapping positions of the foreground objects on the background images are different, so that a variety of cooperative photographing images or videos can be obtained in different layouts, which enriches the social interaction method of photographing, improves the creation efficiency, improves the diversity and quality of creation, and improves the user experiences.

In addition, in some embodiments, the specified background image may the background image of the first image or the background image of the second image. Therefore the first user of the first terminal and the second user of the second terminal can perform cooperative photographing based on the background of either party, so that the user can break through space restrictions and achieve convenient cooperative photographing anytime and anywhere.

Figure 6:
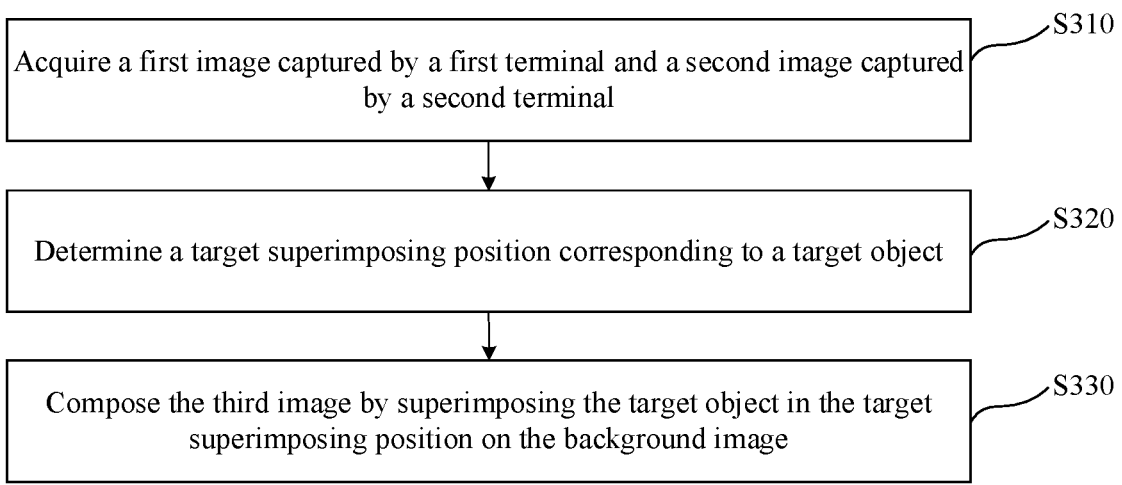
FIG. 6 is a flowchart of a cooperative photographing method according to another embodiment of the present disclosure.

Specifically, FIG. 6 shows a flowchart of a cooperative photographing method according to another embodiment of the present disclosure. The method includes steps S310 to S330.

S310: Acquire a first image captured by a first terminal and a second image captured by a second terminal.

S320: Determine a target superimposing position corresponding to a target object.

S330: Compose the third image by superimposing the target object in the target superimposing position on the background image.

If the background image is the background image of the first image and the target object is the second object, the first image as a whole may be taken as the background image of the current cooperative photographing, and only the second object is extracted from the second image and superimposed on the first image as the foreground object to compose the third image.

Similarly, if the background image is the background image of the second image and the target object is the first object, the second image as a whole may be taken as the background image of the current cooperative photographing, and only the first object is extracted from the first image and superimposed on the second image as the foreground object to compose the third image.

There are many ways to determine the target superimposing position corresponding to the target object, which is not limited in this embodiment.

In some embodiments, the target superimposing position corresponding to the target object is determined according to the determined target cooperative photographing template. The determination of the target cooperative photographing template may be performed with reference to the aforementioned embodiment. After the user selects the target cooperative photographing template for the cooperative photographing, according to the configuration information of the determined target cooperative photographing template, it is determined whether the background image of the cooperative photographing is the first image captured by the first terminal or the second image captured by the second terminal, and the foreground object of the image that is not the background image is determined as the target object. In addition, the target superimposing position of the target object on the background image can also be determined according to the configuration information. Thus, according to the determined target cooperative photographing template, it can be determined the image captured by which terminal is taken as the background image, the foreground object of the image captured by which terminal is taken as the target object, and in which position the target object is to be superimposed on the background image. The third image is composed by extracting the target object and superimposing the target object on the target superimposition position corresponding to the target object. In this way, multiuser cooperative photographing is achieved based on an image captured by any terminal.

It can be understood that the different target cooperative photographing template indicate different target superimposing positions, so that the third image can be composed in different layouts according to different target cooperative photographing templates.

In some other embodiments, the target superimposing position corresponding to the target object is determined according to an image recognition result of the background image. Since the background image in this embodiment is the background image of the first image or the second image, the image recognition on the background image may be performed when determining the foreground object and background object of the first image and/or the second image, and then the target superimposing position corresponding to the target object may be determined according to the image recognition result.

In an embodiment, if the background image is the entire first image or the entire second image, the foreground object of the background image is recognized, and based on the image position of the recognized foreground object, an image position at a preset distance from the foreground object in a preset direction is determined as the target superimposing position.

The preset direction and the preset distance can be determined according to actual requirements, and can be preset by program or customized by the user, which are not limited herein. In some examples, the preset direction may be horizontal right, vertical up, horizontal left, vertical down or other directions, or the preset direction may be a direction defined by a deviation angle. For example, if the image position of the foreground object is taken as a reference point, and the vertical direction is 0 degree, then the direction may be 30 degrees clockwise, 80 degrees clockwise, or the like, which is not limited herein. In some examples, the preset distance may be in unit of pixels. For example, the preset distance may be 50 pixels or 20 pixels, which are not limited herein. Within a certain range, the preset distance may be increased with the increase of image resolution, so as to avoid a situation that the preset distance between the first object and the second object is too large in the composed third image due to a large preset distance and a low image resolution, or a situation that the distance between the first object and the second object is too small in the composed third image or the first and second objects are even overlapped due to a small preset distance and a high image resolution, leading to a better composite effect.

For example, if the background image is the background image of the first image and the target object is the second object, the target superimposing position is determined in an image area that does not contain the first object in the first image, or is determined as a position that is at a preset distance from the first object in a preset direction in the first image. For example, a position at a distance of 60 pixels from the position of the first object in the direction of 30 degrees clockwise is determined as the target superimposing position, and the second object is superimposed in the target superimposing position of the first image to compose the third image. In this case, in the third image, the second object is displayed in the position at the distance of 60 pixels from the first object in the direction of 30 degrees clockwise.

In other embodiments, a position corresponding to an operation performed by the user on the background image is detected as the target superimposing position corresponding to the target object, and then the target object is superimposed in the target superimposing position on the background image to compose the third image.

Figure 7:
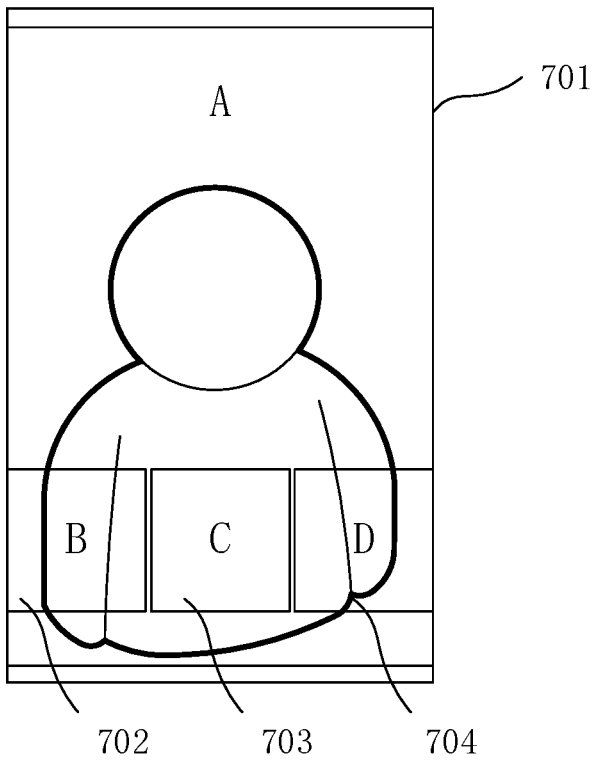
FIG. 7 is a schematic diagram of a display interface according to another exemplary embodiment of the present disclosure.

In an example, a specified background image is taken as the background image of the first image. FIG. 7 is a schematic diagram of a display interface according to another exemplary embodiment of the present disclosure. As shown in FIG. 7, user A initiates a cooperative photographing request, and users B, C and D confirm the cooperative photographing request. In this case, the first image is specified as the background image for cooperative photographing. A terminal acquires images captured in real time by the terminals of users A, B, C and D, determines the target cooperative photographing template according to the template selection instruction, determines the superimposing positions 702, 703, and 704 respectively corresponding to users B, C and D based on the target taking photos template, and superposes the foreground objects corresponding to users B, C and D in positions 702, 703 and 704 respectively to obtain the third image. When displaying the third image, the terminal displays at the same time all the foreground objects of the images captured by the terminals of users A, B, C and D based on the target cooperative photographing template, where the foreground objects corresponding to users B, C and D are superposed on the background image corresponding to user A.

It should be noted that the above is only an example, and the disclosure is not limited thereto. The embodiments of the disclosure may further support the composition of various cooperative photographing templates, which will not be described for concision.

It should be noted that, for the parts not described in detail in this embodiment, one may refer to the previous embodiment, which will not be repeated here.

Therefore, with the cooperative photographing method provided in this embodiment, the first image acquired by the first terminal or the second image acquired by the second terminal may be used as the background image, and the foreground of the image not used as the background image is separated from the background and used as the target object, which is superimposed in the target superimposing position corresponding to the target object to compose the third image. In this way, the cooperative photographing is achieved based on the background image of any participating terminal, so that the cooperative photographing is not limited by geographical locations.

Figure 8:
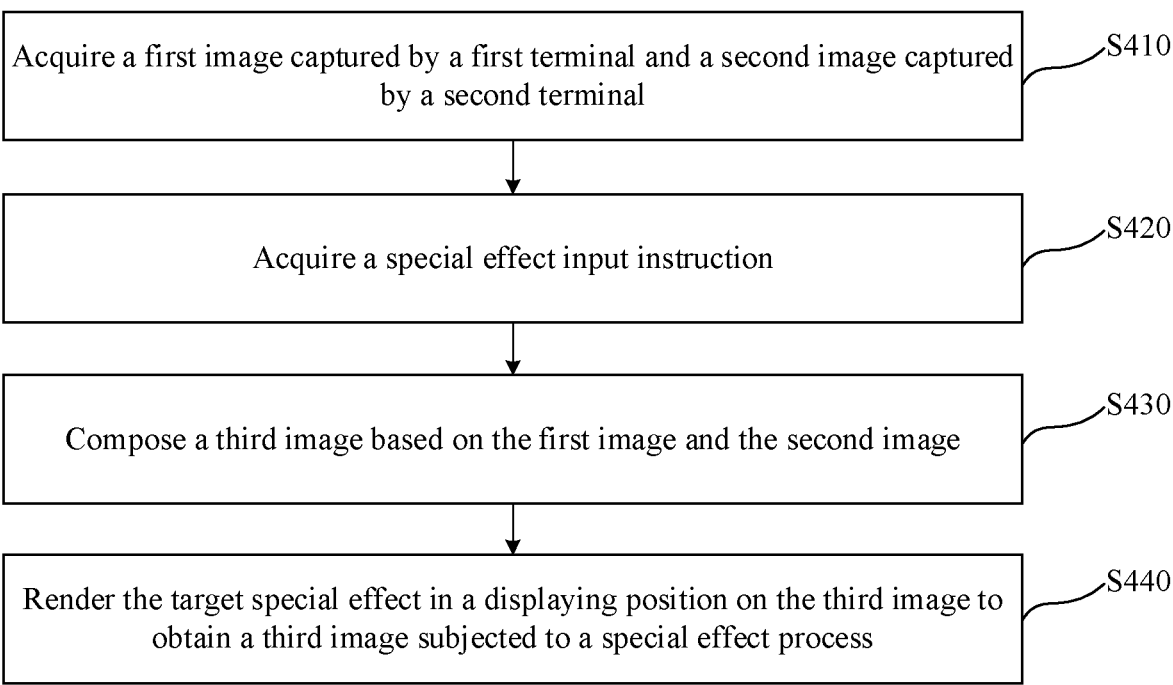
FIG. 8 is a flowchart of a cooperative photographing method according to another embodiment of the present disclosure.

In addition, in some embodiments, in the process of cooperative photographing, the first user and the second user can both input special effect input instructions through their own terminals to add special effects to the currently captured images, further enriching the photographing method. At the same time of interaction by cooperative photographing, the users can add further special effects to their own or other's captured images to improve video interest. The operation is simple and can be perform in real time, which improves the creation efficiency and quality of video creators, i.e., the users participating in the cooperative photographing, and improves the flexibility and interest of cooperative photographing. Specifically, FIG. 8 shows a flowchart of a cooperative photographing method according to another embodiment of the present disclosure. In this embodiment, the method includes S410 to S440.

S410: Acquire a first image captured by a first terminal and a second image captured by a second terminal.

S420: Acquire a special effect input instruction.

S430: Compose a third image based on the first image and the second image.

S340: Render the target special effect in a displaying position on the third image to obtain a third image subjected to a special effect process.

The special effect input instruction includes the target special effect to be added and a position corresponding to the target special effect. It should be noted that the special effect input instruction may be acquired before or after the composition of the third image, that is, step S420 may be performed before or after step S430, which is not limited in this embodiment.

In an example, the photographing interface of the terminal used in the process of cooperative photographing may further include a special effect adding button. When a trigger operation acting on the special effect adding button is detected, a special effect adding page is displayed. Multiple special effects may be displayed in the special effect adding page, and a selected special effect is determined as the target special effect to be added. The special effects may include adding rabbit ears, changing face, slimming face or others. The above special effects may not include sound, or may be combined with sound effects, or may be pure sound effects. This embodiment does not limit the types of special effects to be added. In other embodiments, special effects may be referred to as tools, and some functions such as filtering function and beauty function may also be used as special effects.

In some embodiments, different special effects have different adding attributes. For example, some special effects are local effects which are only added to a part of an image. After selecting the target effect to be added, the user needs to select a position through the photographing interface as the position corresponding to the target effect. For another example, some special effects are global effects, for which users do not need to select positions, but use the entire third image as the displaying position.

Further, in some embodiments, after the third image subjected to a special effect process is obtained, the third image subjected to the special effect process is displayed, so that users can view the added special effect in real time, which further improves the social interaction and interestingness of the cooperative photographing, and improves the photographing quality. Furthermore, the cooperative photographing process can easily add special effects without post production, which improves the creation efficiency.

It should be noted that, for the parts not described in detail in this embodiment, one may refer to the previous embodiments, which will not be repeated here.

Therefore, with the cooperative photographing method provided in this embodiment, in the process of cooperative photographing, the special effect input instruction is acquired, and the target special effect is rendered at the displaying position in the third image to obtain the rendered third image. In this way, users can add special effects in the process of cooperative photographing conveniently. In addition, the embodiment of the present disclosure can achieve real-time cooperative photographing and real-time display, so that users participating in the cooperative photographing can view the pictures added with special effects in real time, which further improves the social interaction and interestingness of the cooperative photographing, and improves the photographing quality. Furthermore, the cooperative photographing process can easily add special effects without post production, which improves the creation efficiency.

Figure 9:
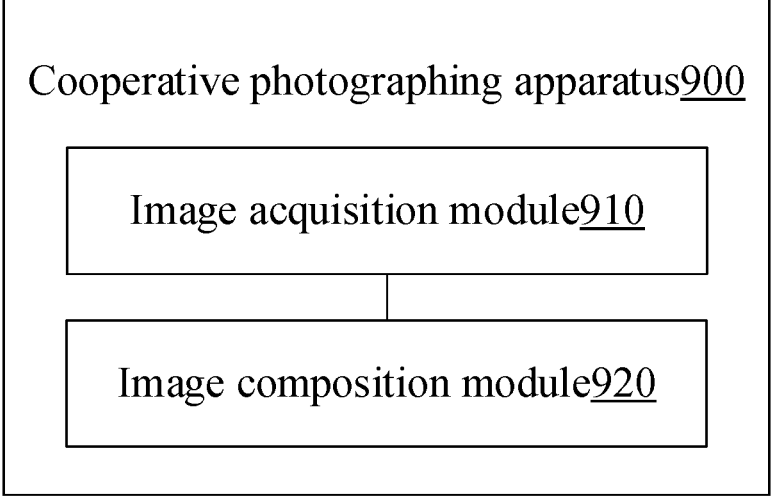
FIG. 9 is module block diagram of a cooperative photographing apparatus according to an embodiment of the present disclosure.

FIG. 9 is module block diagram of a cooperative photographing apparatus according to an embodiment of the present disclosure. The cooperative photographing apparatus 900 may be applied to a terminal or a server, and specifically includes an image acquisition module 910 and an image composition module 930.

The image acquisition module 910 is configured to acquire a first image captured by a first terminal and a second image captured by a second terminal.

The image composition module 920 is configured to compose a third image based on the first image and the second image, where in the third image, a first object in the first image and a second object in the second image are used as foreground objects and superimposed on a specified background image, the first object is a foreground object of the first image, and the second object is a foreground object of the second image.

In an embodiment, the background image is a fourth image selected by a user.

In an embodiment, the background image is a background image of the first image or a background image of the second image.

In an embodiment, the image composition module 920 includes a position determination sub-module and a superimposing composition sub-module.

The position determination sub-module is configured to determine a first superimposing position corresponding to the first object and a second superimposing position corresponding to the second object according to a determined target cooperative photographing template.

The superimposing composition sub-module is configured to compose the third image by superimposing the first object in the first superimposing position on the background image and superimposing the second object in the second superimposing position on the background image.

In an embodiment, the image composition module 920 includes a target position determination sub-module and a target superimposing composition sub-module.

The target position determination sub-module is configured to determine a target superimposing position corresponding to a target object, where in a case that the background image is the background image of the first image, the target object is the second object, and in a case that the background image is the background image of the second image, the target object is the first object.

The target superimposing composition sub-module is configured to compose the third image by superimposing the target object in the target superimposing position on the background image.

In an embodiment, the target position determination sub-module includes a template determination unit or a recognition and determination unit.

The template determination unit is configured to determine the target superimposing position corresponding to the target object according to a determined target cooperative photographing template.

The recognition and determination unit is configured to determine the target superimposing position corresponding to the target object according to an image recognition result of the background image.

In an embodiment, before composing the third image based on the first image and the second image, the cooperative photographing apparatus 900 further includes a template instruction acquisition module and a template determination module.

The template instruction acquisition module is configured to acquire a template selection instruction.

The template determination module is configured to determine, according to the template selection instruction, a target cooperative photographing template from a plurality of candidate cooperative photographing templates, where the target cooperative photographing template is used to determine a superimposing position where the foreground object is to be superimposed on the background image.

In an embodiment, before composing the third image based on the first image and the second image, the cooperative photographing apparatus 900 further includes a special effect instruction acquisition module and a special effect processing module.

The special effect instruction acquisition module is configured to acquire a special effect input instruction, where the special effect input instruction includes a target special effect to be added and a displaying position corresponding to the target special effect.

After composing the third image based on the first image and the second image, the photographing apparatus 900 further includes a special effect processing module, configured to render the target special effect in the displaying position on the third image to obtain the third image subjected to a special effect process.

In an embodiment, if the cooperative photographing apparatus 900 is applied to a first terminal, before acquiring the first image captured by the first terminal and the second image captured by the second terminal, the cooperative photographing apparatus 900 further includes a cooperative photographing request module, which is configured to generate a cooperative photographing request in responses to a received cooperative photographing trigger instruction inputted by a user, and send the cooperative photographing request to the second terminal, where the second image is sent by the second terminal to the first terminal in response to the cooperative photographing request.

The cooperative photographing apparatus in the embodiments of the present disclosure is used to perform the cooperative photographing method provided in the embodiments of the present disclosure, and has similar implementation principles as the method. The actions performed by each module in the cooperative photographing apparatus in the embodiments of the present disclosure are corresponding to the steps in the cooperative photographing method in the embodiments of the present disclosure. For the detailed function description of each module of the cooperative photographing apparatus, one may refer to the above description of the corresponding cooperative photographing method, which will not be repeated here.

Figure 10:
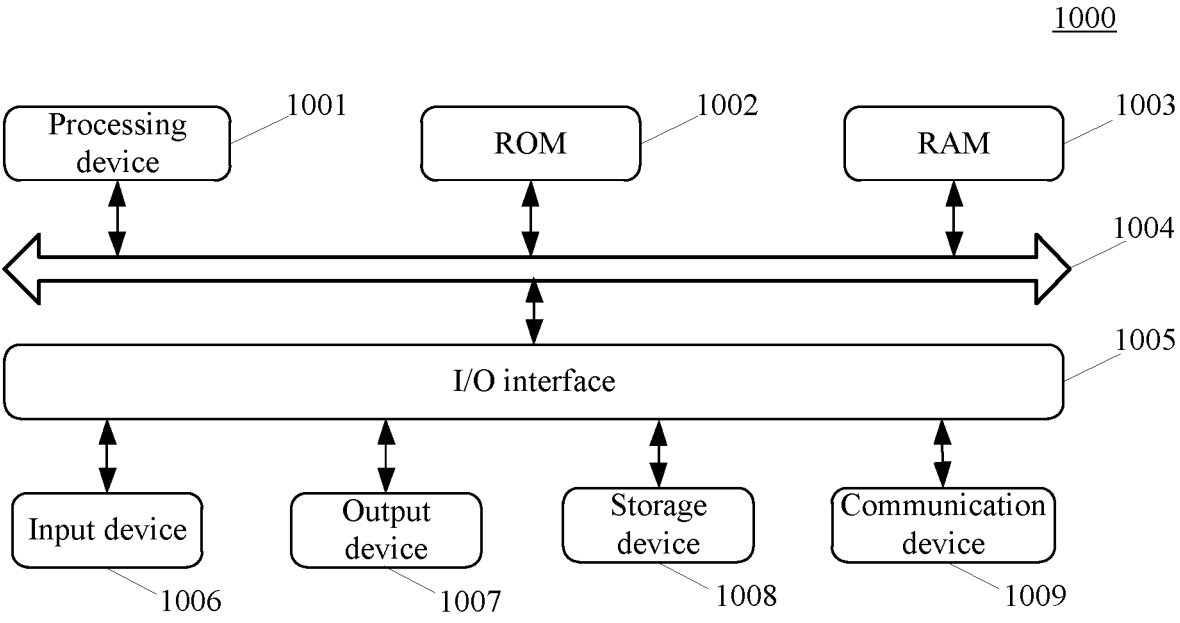
FIG. 10 is structural block diagram of an electronic device according to an embodiment of the present disclosure.

FIG. 10 shows a schematic structural diagram of an electronic device 1000 suitable for implementing the embodiments of the present disclosure. The electronic devices in the embodiments of the present disclosure may include, but are not limited to, computers, mobile phones and other terminals, servers and the like. The electronic device shown in FIG. 10 is only an example, and should not bring restrictions on the function and scope of the embodiments of the present disclosure.

The electronic device 1000 includes a memory and a processor. The processor may be referred to as a processing device 1001 hereinafter, and the memory may include at least one of a read-only memory (ROM) 1002, a random access memory (RAM) 1003, and a storage device 1008 in the following description.

As shown in FIG. 10, the electronic device 1000 may include a processing device (such as a central processing unit, a graphics processor) 1001 that may execute various appropriate actions and processes according to a program stored in a read only memory (ROM) 1002 or loaded into a random access memory (RAM) 1003 from a storage device 1008. In the RAM 1003, various programs and data necessary for the operation of the electronic device 1000 are also stored. The processing device 1001, the ROM 1002, and the RAM 1003 are connected to each other through a bus 1004. An input/output (I/O) interface 1005 is also connected to the bus 1004.

Normally, the following devices may be connected to the I/O interface 1005: an input device 1006 such as a touch screen, a touchpad, a keyboard, a mouse, a camera, a microphone, an accelerometer, a gyroscope and the like; an output device 1007, such as a liquid crystal display (LCD), a speaker, a vibrator and the like; a storage device 1008, such as a magnetic tape, a hard disk and the like; and a communication device 1009. The communication device 1009 may enable the electronic device to communicate in a wireless or wired manner with other devices to exchange data. Although FIG. 10 shows the electronic device having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 1009, or from the storage device 1008, or from the ROM 1002. When the computer program is executed by the processing device 1001, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In the present disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: acquire a first image captured by a first terminal and a second image captured by a second terminal; and compose a third image based on the first image and the second image, where in the third image, a first object in the first image and a second object in the second image are used as foreground objects and superimposed on a specified background image, the first object is a foreground object of the first image, and the second object is a foreground object of the second image.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (e.g., using Internet connection provided by an Internet service provider).

The flowchart and block diagrams in the figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The modules or units involved in the embodiments of the present disclosure may be implemented in a software manner, or in a hardware manner. The name of the unit does not constitute a limitation of the unit under any circumstances. For example, a displaying unit may be described as a unit for displaying a resource upload interface.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof According to one or more embodiments of the present disclosure, a cooperative photographing method is provided, which is applied to a first terminal. The method includes: acquiring a first image captured by a first terminal and a second image captured by a second terminal; and composing a third image based on the first image and the second image, where in the third image, a first object in the first image and a second object in the second image are used as foreground objects and superimposed on a specified background image, the first object is a foreground object of the first image, and the second object is a foreground object of the second image.

In an embodiment, the background image is a fourth image selected by a user.

In an embodiment, the background image is a background image of the first image or a background image of the second image.

In an embodiment, the composing a third image based on the first image and the second image includes: determining a first superimposing position corresponding to the first object and a second superimposing position corresponding to the second object according to a determined target cooperative photographing template; and composing the third image by superimposing the first object in the first superimposing position on the background image and superimposing the second object in the second superimposing position on the background image.

In an embodiment, the composing a third image based on the first image and the second image includes: determining a target superimposing position corresponding to a target object, where in a case that the background image is the background image of the first image, the target object is the second object, and in a case that the background image is the background image of the second image, the target object is the first object; and composing the third image by superimposing the target object in the target superimposing position on the background image.

In an embodiment, the determining a target superimposing position corresponding to a target object includes: determining the target superimposing position corresponding to the target object according to a determined target cooperative photographing template; or determining the target superimposing position corresponding to the target object according to an image recognition result of the background image.

In an embodiment, before the composing a third image based on the first image and the second image, the method further includes: obtaining a template selection instruction; and determining, according to the template selection instruction, a target cooperative photographing template from a plurality of candidate cooperative photographing templates, where the target cooperative photographing template is used to determine a superimposing position where the foreground object is to be superimposed on the background image.

In an embodiment, before the composing a third image based on the first image and the second image, the method further includes: acquiring a special effect input instruction, where the special effect input instruction includes a target special effect to be added and a displaying position corresponding to the target special effect. After the composing a third image based on the first image and the second image, the method further includes: rendering the target special effect in the displaying position on the third image to obtain the third image subjected to a special effect process.

In an embodiment, the method is applied to a first terminal, and before the acquiring a first image captured by a first terminal and a second image captured by a second terminal, the method further includes: generating a cooperative photographing request in responses to a received cooperative photographing trigger instruction inputted by a user; and sending the cooperative photographing request to the second terminal, where the second image is sent by the second terminal to the first terminal in response to the cooperative photographing request.

According to one or more embodiments of the present disclosure, a cooperative photographing apparatus is provided, including: an image acquisition module configured to acquire a first image captured by a first terminal and a second image captured by a second terminal; and an image composition module configured to compose a third image based on the first image and the second image, where in the third image, a first object in the first image and a second object in the second image are used as foreground objects and superimposed on a specified background image, the first object is a foreground object of the first image, and the second object is a foreground object of the second image.

In an embodiment, the background image is a fourth image selected by a user.

In an embodiment, the background image is a background image of the first image or a background image of the second image.

In an embodiment, the image composition module includes a position determination sub-module and a superimposing composition sub-module. The position determination sub-module is configured to determine a first superimposing position corresponding to the first object and a second superimposing position corresponding to the second object according to a determined target cooperative photographing template. The superimposing composition sub-module is configured to compose the third image by superimposing the first object in the first superimposing position on the background image and superimposing the second object in the second superimposing position on the background image.

In an embodiment, the image composition module includes a target position determination sub-module and a target superimposing composition sub-module. The target position determination sub-module is configured to determine a target superimposing position corresponding to a target object, where in a case that the background image is the background image of the first image, the target object is the second object, and in a case that the background image is the background image of the second image, the target object is the first object. The target superimposing composition sub-module is configured to compose the third image by superimposing the target object in the target superimposing position on the background image.

In an embodiment, the target position determination sub-module includes a template determination unit or a recognition and determination unit. The template determination unit is configured to determine the target superimposing position corresponding to the target object according to a determined target cooperative photographing template. The recognition and determination unit is configured to determine the target superimposing position corresponding to the target object according to an image recognition result of the background image.

In an embodiment, before composing the third image based on the first image and the second image, the cooperative photographing apparatus further includes a template instruction acquisition module and a template determination module. The template instruction acquisition module is configured to acquire a template selection instruction. The template determination module is configured to determine, according to the template selection instruction, a target cooperative photographing template from a plurality of candidate cooperative photographing templates, where the target cooperative photographing template is used to determine a superimposing position where the foreground object is to be superimposed on the background image.

In an embodiment, before composing the third image based on the first image and the second image, the cooperative photographing apparatus further includes a special effect instruction acquisition module and a special effect processing module. The special effect instruction acquisition module is configured to acquire a special effect input instruction, where the special effect input instruction includes a target special effect to be added and a displaying position corresponding to the target special effect. After composing the third image based on the first image and the second image, the photographing apparatus further includes a special effect processing module, configured to render the target special effect in the displaying position on the third image to obtain the third image subjected to a special effect process.

In an embodiment, if the cooperative photographing apparatus is applied to a first terminal, before acquiring the first image captured by the first terminal and the second image captured by the second terminal, the cooperative photographing apparatus further includes a cooperative photographing request module, which is configured to generate a cooperative photographing request in responses to a received cooperative photographing trigger instruction inputted by a user, and send the cooperative photographing request to the second terminal, where the second image is sent by the second terminal to the first terminal in response to the cooperative photographing request.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

It should be noted that although the above operations are described in a specific order, it should not be understood that these operations are required to be performed in the specific order or performed in a sequential order. Under certain circumstances, multitasking and parallel processing may be advantageous. Although multiple implementation details are included in the above descriptions, the details should not be interpreted as limitations to the scope of the present disclosure. The features described in multiple separate embodiments may be implemented in combination in a separate embodiment. Conversely, the features described in a separate embodiment may be implemented in multiple embodiments individually or in any suitable sub-combination. Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

What is claimed is:

1. A cooperative photographing method, comprising:

acquiring a first image captured in real time by a first terminal and a second image captured in real time by a second terminal;

in real time, composing a third image based on the first image and the second image, the real-time composed third image being displayed, in real time, on the first terminal and the second terminal; and generating a cooperative video based on the real-time composed third image, wherein in the third image, a first object in the first image and a second object in the second image are used as foreground objects and superimposed on a specified background image, the first object is a foreground object of the first image, and the second object is a foreground object of the second image, wherein the first object in the cooperative video is dynamic, and the second object in the cooperative video is dynamic, wherein the first object is obtained based on an image recognition processing on the first image, and the second object is obtained based on an image recognition processing on the second image, and wherein a superimposing position of the foreground object is determined according to an image recognition result of the background image.

2. The method according to claim 1, wherein the background image is a fourth image selected by a user.

3. The method according to claim 1, wherein the background image is a background image of the first image or a background image of the second image.

4. The method according to claim 2, wherein the composing a third image based on the first image and the second image comprises:

determining a first superimposing position corresponding to the first object and a second superimposing position corresponding to the second object according to a determined target cooperative photographing template; and composing the third image by superimposing the first object in the first superimposing position on the background image and superimposing the second object in the second superimposing position on the background image.

5. The method according to claim 3, wherein the composing a third image based on the first image and the second image comprises:

determining a target superimposing position corresponding to a target object, wherein in a case that the background image is the background image of the first image, the target object is the second object, and in a case that the background image is the background image of the second image, the target object is the first object; and composing the third image by superimposing the target object in the target superimposing position on the background image.

6. The method according to claim 5, wherein the determining a target superimposing position corresponding to a target object comprises:

determining the target superimposing position corresponding to the target object according to a determined target cooperative photographing template.

7. The method according to claim 4, wherein before the composing a third image based on the first image and the second image, the method further comprises:

obtaining a template selection instruction; and determining, according to the template selection instruction, a target cooperative photographing template from a plurality of candidate cooperative photographing templates, wherein the target cooperative photographing template is used to determine a superimposing position where the foreground object is to be superimposed on the background image.

8. The method according to claim 1, further comprising:

acquiring a special effect input instruction, wherein the special effect input instruction comprises a target special effect to be added and a displaying position corresponding to the target special effect, wherein after the composing a third image based on the first image and the second image, the method further comprises:

rendering the target special effect in the displaying position on the third image to obtain the third image subjected to a special effect process.

9. The method according to claim 1, wherein the method is applied to a first terminal, and before the acquiring a first image captured by a first terminal and a second image captured by a second terminal, the method further comprises:

generating a cooperative photographing request in responses to a received cooperative photographing trigger instruction inputted by a user; and sending the cooperative photographing request to the second terminal, wherein the second image is sent by the second terminal to the first terminal in response to the cooperative photographing request.

10. A cooperative photographing apparatus, comprising:

at least one processor, and at least one memory communicatively coupled to the at least one processor and storing instructions that upon execution by the at least one processor cause the apparatus to:

acquire a first image captured in real time by a first terminal and a second image captured in real time by a second terminal;

in real time, compose a third image based on the first image and the second image, the real-time composed third image being displayed, in real time, on the first terminal and the second terminal; and generate a cooperative video based on the real-time composed third image, wherein in the third image, a first object in the first image and a second object in the second image are used as foreground objects and superimposed on a specified background image, the first object is a foreground object of the first image, and the second object is a foreground object of the second image, wherein the first object in the cooperative video is dynamic, and the second object in the cooperative video is dynamic, wherein the first object is obtained based on an image recognition processing on the first image, the second object is obtained based on an image recognition processing on the second image, and wherein a superimposing position of the foreground object is determined according to an image recognition result of the background image.

11. The apparatus of claim 10, wherein the background image is a fourth image selected by a user.

12. The apparatus of claim 10, wherein the background image is a background image of the first image or a background image of the second image.

13. The apparatus of claim 11, the at least one memory further storing instructions that upon execution by the at least one processor cause the apparatus to:

determine a first superimposing position corresponding to the first object and a second superimposing position corresponding to the second object according to a determined target cooperative photographing template; and compose the third image by superimposing the first object in the first superimposing position on the background image and superimposing the second object in the second superimposing position on the background image.

14. The apparatus of claim 12, the at least one memory further storing instructions that upon execution by the at least one processor cause the apparatus to:

determine a target superimposing position corresponding to a target object, wherein in a case that the background image is the background image of the first image, the target object is the second object, and in a case that the background image is the background image of the second image, the target object is the first object; and compose the third image by superimposing the target object in the target superimposing position on the background image.

15. The apparatus of claim 14, the at least one memory further storing instructions that upon execution by the at least one processor cause the apparatus to:

determine the target superimposing position corresponding to the target object according to a determined target cooperative photographing template.

16. The apparatus of claim 12, the at least one memory further storing instructions that upon execution by the at least one processor cause the apparatus to:

obtain a template selection instruction; and determine, according to the template selection instruction, a target cooperative photographing template from a plurality of candidate cooperative photographing templates, wherein the target cooperative photographing template is used to determine a superimposing position where the foreground object is to be superimposed on the background image.

17. The apparatus of claim 10, the at least one memory further storing instructions that upon execution by the at least one processor cause the apparatus to:

acquire a special effect input instruction, wherein the special effect input instruction comprises a target special effect to be added and a displaying position corresponding to the target special effect, wherein after the composing a third image based on the first image and the second image, the method further comprises:

render the target special effect in the displaying position on the third image to obtain the third image subjected to a special effect process.

18. The apparatus of claim 10, wherein the apparatus is a first terminal, and before the acquiring a first image captured by a first terminal and a second image captured by a second terminal, the at least one memory further storing instructions that upon execution by the at least one processor cause the apparatus to:

generate a cooperative photographing request in responses to a received cooperative photographing trigger instruction inputted by a user; and send the cooperative photographing request to the second terminal, wherein the second image is sent by the second terminal to the first terminal in response to the cooperative photographing request.

19. A computer-readable non-transitory storage medium, bearing computer-readable instructions that upon execution on a computing device cause the computing device at least to:

acquire a first image captured in real time by a first terminal and a second image captured in real time by a second terminal;

in real time, compose a third image based on the first image and the second image, the real-time composed third image being displayed, in real time, on the first terminal and the second terminal; and generate a cooperative video based on the real-time composed third image, wherein in the third image, a first object in the first image and a second object in the second image are used as foreground objects and superimposed on a specified background image, the first object is a foreground object of the first image, and the second object is a foreground object of the second image, wherein the first object in the cooperative video is dynamic, and the second object in the cooperative video is dynamic, wherein the first object is obtained based on an image recognition processing on the first image, the second object is obtained based on an image recognition processing on the second image, and wherein a superimposing position of the foreground object is determined according to an image recognition result of the background image.

* * * * *